(12) United States Patent
Oda et al.

(10) Patent No.: US 7,239,352 B2
(45) Date of Patent: Jul. 3, 2007

(54) METHOD OF READING OUT SIGNALS FROM HIGHER AND LOWER PHOTOSENSITIVITY REGIONS OF A SOLID-STATE IMAGE PICKUP APPARATUS

(75) Inventors: Kazuya Oda, Asaka (JP); Hirokazu Kobayashi, Asaka (JP)

(73) Assignee: Fujifilm Corporation, Tokyo (JP)

( * ) Notice: Subject to any disclaimer, the term of this patent is extended or adjusted under 35 U.S.C. 154(b) by 819 days.

(21) Appl. No.: 10/671,448

(22) Filed: Sep. 29, 2003

(65) Prior Publication Data

US 2004/0070680 A1   Apr. 15, 2004

(30) Foreign Application Priority Data

Sep. 30, 2002   (JP) .............................. 2002-285495

(51) Int. Cl.
*H04N 5/238* (2006.01)
*H04N 3/14* (2006.01)
*H04N 5/335* (2006.01)
*H04N 9/04* (2006.01)
*H04N 9/083* (2006.01)
*H01L 31/062* (2006.01)
*H01L 27/00* (2006.01)

(52) U.S. Cl. ...................... 348/364; 348/275; 348/315; 257/291; 250/208.1

(58) Field of Classification Search ................ 348/275, 348/302, 315, 364, 349, 229.1, 230.1, 234, 348/236
See application file for complete search history.

(56) References Cited

U.S. PATENT DOCUMENTS

| 5,111,301 A * | 5/1992 | Haruki et al. ................ 348/364 |
| 6,630,960 B2 * | 10/2003 | Takahashi et al. .......... 348/364 |
| 6,831,692 B1 * | 12/2004 | Oda ............................ 348/315 |
| 6,982,759 B2 * | 1/2006 | Goto ........................... 348/302 |
| 2004/0012711 A1 * | 1/2004 | Tamaru et al. .............. 348/362 |

FOREIGN PATENT DOCUMENTS

| JP | 09-205589 | * | 8/1997 |
| JP | 10-136391 A | | 5/1998 |
| JP | 2000-152259 | * | 5/2000 |

\* cited by examiner

*Primary Examiner*—Tuan Ho
*Assistant Examiner*—Kelly Jerabek
(74) *Attorney, Agent, or Firm*—Birch, Stewart, Kolasch & Birch, LLP

(57) ABSTRACT

In a signal reading method for a solid-state image pickup apparatus, an estimated photometric value is calculated at the time of preliminary image pickup and compared with a threshold value set beforehand. If the estimated photometric value is smaller than the threshold value, it is then determined that a scene to be pickup up has a narrower dynamic range to execute control reading out signal charges from the main and subregions of the individual photosensitive cell while mixing them together. If the estimated photometric value is not smaller than the threshold value, the signal charges of the main and subregions are read out independently of each other.

4 Claims, 5 Drawing Sheets

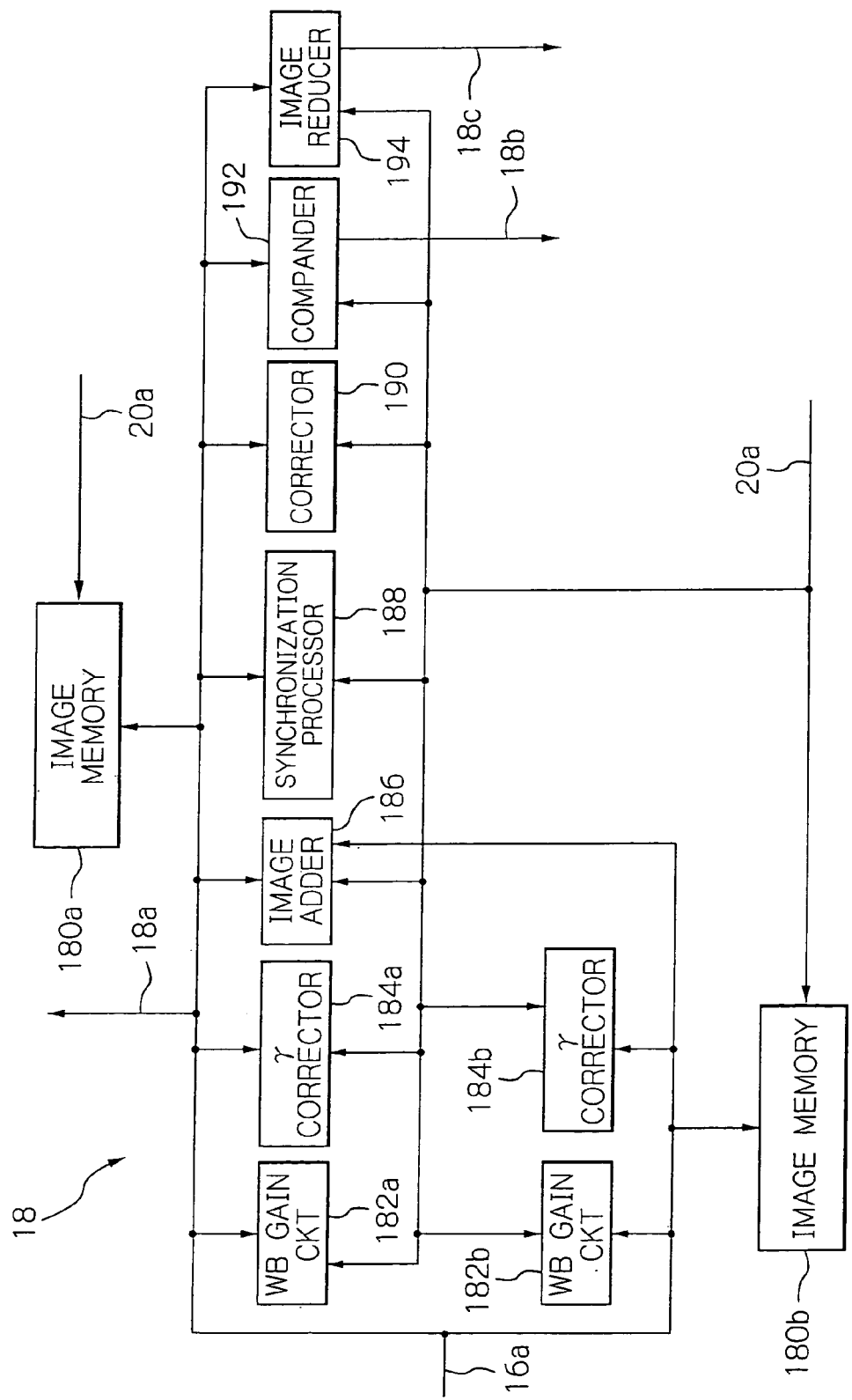

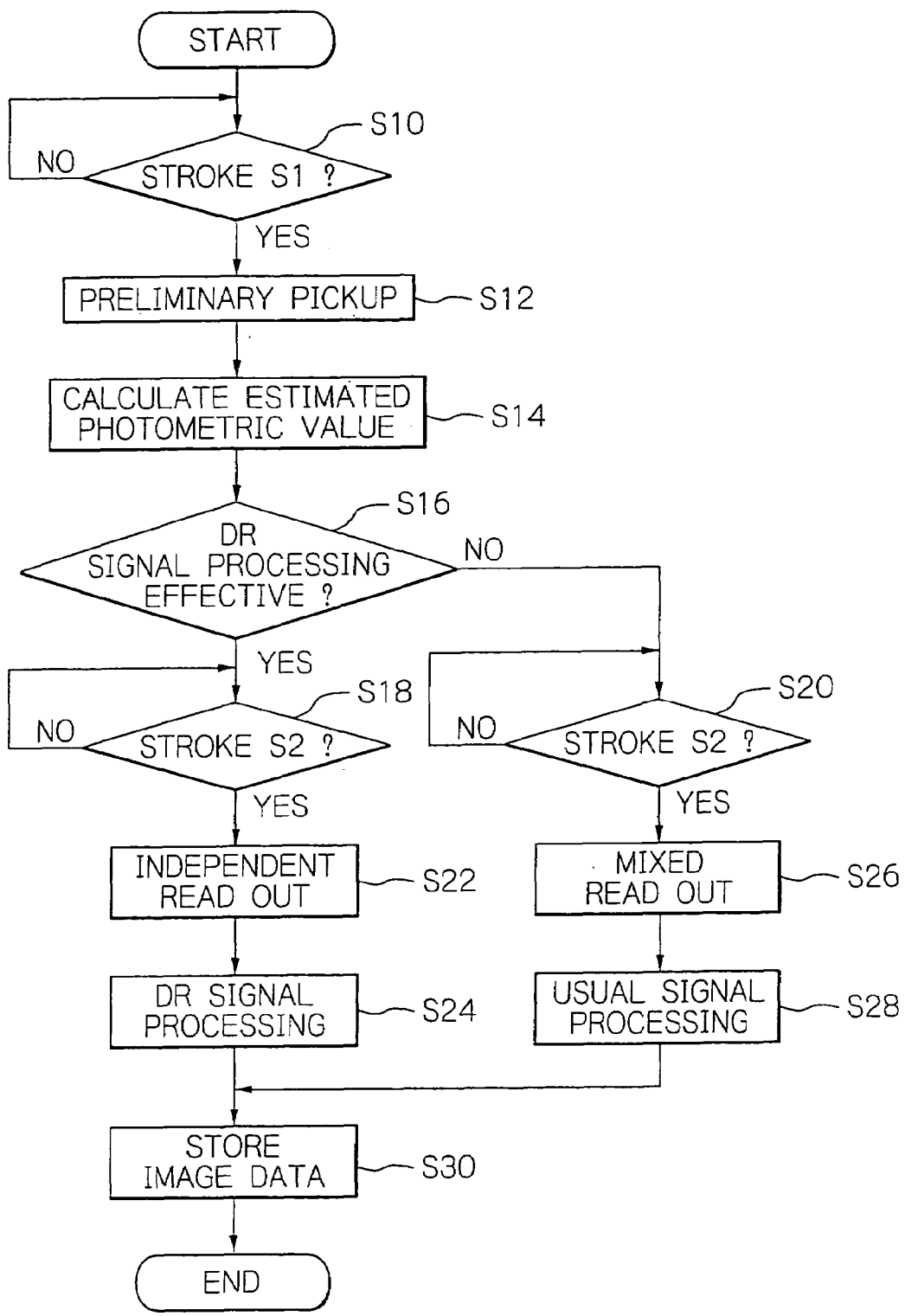

METHOD OF READING OUT SIGNALS FROM HIGHER AND LOWER PHOTOSENSITIVITY REGIONS OF A SOLID-STATE IMAGE PICKUP APPARATUS

This Nonprovisional application claims priority under 35 U.S.C. § 119(a) on Patent Application No(s). 2002-285495 filed in Japan on Sep. 30, 2002, the entire contents of which are hereby incorporated by reference.

BACKGROUND OF THE INVENTION

1. Field of the Invention

The present invention relates to a method of reading out signals from a solid-state image pickup apparatus in which photosensitive cells for photoelectric transduction are arranged in a so-called honeycomb pattern.

2. Description of the Background Art

Generally, a solid-state image pickup apparatus is apt to generate moire and other false signals. Japanese Patent Laid-Open Publication No. 136391/1998, for example, discloses a solid-state image pickup apparatus having pixels densely arranged so as to increase the received quantity of incident light, thereby promoting efficient receipt of light. The apparatus taught in this document provides a new structure that optimizes spatial sampling of an image and is referred to as a honeycomb pixel arrangement.

In the honeycomb pixel arrangement, assuming that the distance between nearby pixels on the same row or the same column is a pitch, then pixels around a given pixel each are shifted from the given pixel by half a pitch in the direction of row and/or the direction of column. In a CCD (Charge-Coupled Device) type of solid-state image sensor using the honeycomb pixel arrangement, vertical transfer registers constitute vertical transfer paths extending zigzag in such a manner as to skirt round the pixels. Color filter segments are assigned to actually existing ones of the pixels. The pixels, or photosensitive cells, photoelectrically transduce light incident thereto through the color filter segments to thereby generate signal charges having color attributes. The signal charges are then sequentially routed through the vertical transfer registers and horizontal transfer registers, which constitute a horizontal transfer path perpendicular to the vertical transfer path, to an output amplifier. The output amplifier performs Q/V conversion for outputting voltage signals in the form of analog signals.

The analog signals thus generated are subjected to signal processing. First, a correlation between pixel data is determined with consideration given to the colors of actual pixels. More specifically, pixel data of a color in question closely correlated to each other are used to estimate, by calculation, pixel data at a virtual pixel, defined as a pixel at which the actual pixels are not positioned, and pixel data at actual pixels of a color different from the color in question. Subsequently, one of such pixel data appearing in a direction closer in correlation than the remaining pixel data is used for interpolating virtual pixels. Such interpolation successfully reduces false signals. Further, the pixel data are successfully broadened in frequency band, enhancing resolution.

It has also been proposed to use the honeycomb pixel arrangement for further enhancing the resolution of an image and broadening the dynamic range of image signals generated. In accordance with a specific conventional scheme directed toward this object, the photosensitive area of the individual photosensitive cell is divided into a main region and a subregion different in size from each other, so that signal charges are read out from the two regions independently of each other. This scheme broadens the dynamic range on the basis of a difference in sensitivity between the main and subregions. In a usual signal reading mode, the signal charges of the main and subregions are mixed together and read out in the conventional manner.

Processing for broadening the dynamic range is determined by the sensitivity difference between the photosensitive regions and the saturation in a pair of photosensitive regions.

In order to broaden the dynamic range, it is a common practice to design the solid-state image pickup apparatus so as to simply read out a signal charge from the main region of the individual photosensitive cell and then read out a signal charge from the subregion of the same photosensitive cell in the interlace fashion. Image data derived from the signals sequentially read out from the main and subregions are in turn added to broaden the reproducible range of the quantity of incident light.

The conventional solid-state image pickup apparatus has the following problems left unsolved. By preliminary image shooting or pickup that precedes actual image shooting or pickup, the image pickup apparatus performs photometry and then executes AE (Automatic Exposure) and AF (Automatic Focus) control with optics, thereby estimating the luminance distribution of a scene to be picked up. A problem is that, despite that a scene to be captured sometimes does not require the processing for broadening the dynamic range, depending upon the luminance distribution thus estimated, the apparatus is adapted to read out signal charges from the main and subregions in the interlace fashion without exception. Today, to meet an increasing demand for, e.g. a digital camera having a larger number of pixels and therefore higher image quality, efforts are being made toward shorter signal reading time and higher signal processing speed. This, however, requires a high voltage for processing and thereby aggravates power consumption.

On the other hand, a digital camera is powered by a battery so as to implement a small size, light weight, portable configuration. Thus, the reduction of power consumption and a power supply available with a digital camera are contradictory to each other. Because priority is, in practice, given to the effective use of a battery, a device for saving power is the target to tackle.

SUMMARY OF THE INVENTION

It is an object of the present invention to provide a signal reading method for a solid-state image pickup apparatus capable of efficiently reading out signals to thereby save power while insuring high image quality.

A signal reading method of the present invention is applied to a solid-stated image pickup apparatus including a solid-state image sensor in which a plurality of photosensitive cells are arranged in a bidimensional array, each of the photosensitive cells comprising a main region and a subregion smaller in area than the main region for converting incident light to signal charges. The signal reading method begins with the steps of causing the image pickup apparatus to perform preliminary image pickup of a scene, and determining a luminance distribution representative of the scene subject to the preliminary image pickup on the basis of pixel data obtained from a plurality of blocks formed in the bidimentional array of the image sensor to calculate an estimated photometric value that estimates the scene. The estimated photometric value is compared with a predetermined threshold value, above which a dynamic range is effective which defines the reproducible range of the incident light. If the estimated photometric value is smaller than the threshold value, the image sensor is controlled for reading out the signal charges generated in the main and subregions of the individual photosensitive cell while mixing them together. If the estimated photometric value is not smaller than the threshold value, the image sensor is controlled for reading out the signal charges generated in the main and subregions of the individual photosensitive cell individually from each other.

BRIEF DESCRIPTION OF THE DRAWINGS

The objects and features of the present invention will become more apparent from consideration of the following detailed description taken in conjunction with the accompanying drawings in which:

FIG. 3 is a schematic block diagram showing a specific configuration of a signal processor included in the digital camera of FIG. 1;

FIG. 4 is a flowchart useful for understanding a specific procedure executed by the illustrative embodiment in a camera or still picture mode.

DESCRIPTION OF THE PREFERRED EMBODIMENT

Figure 1:
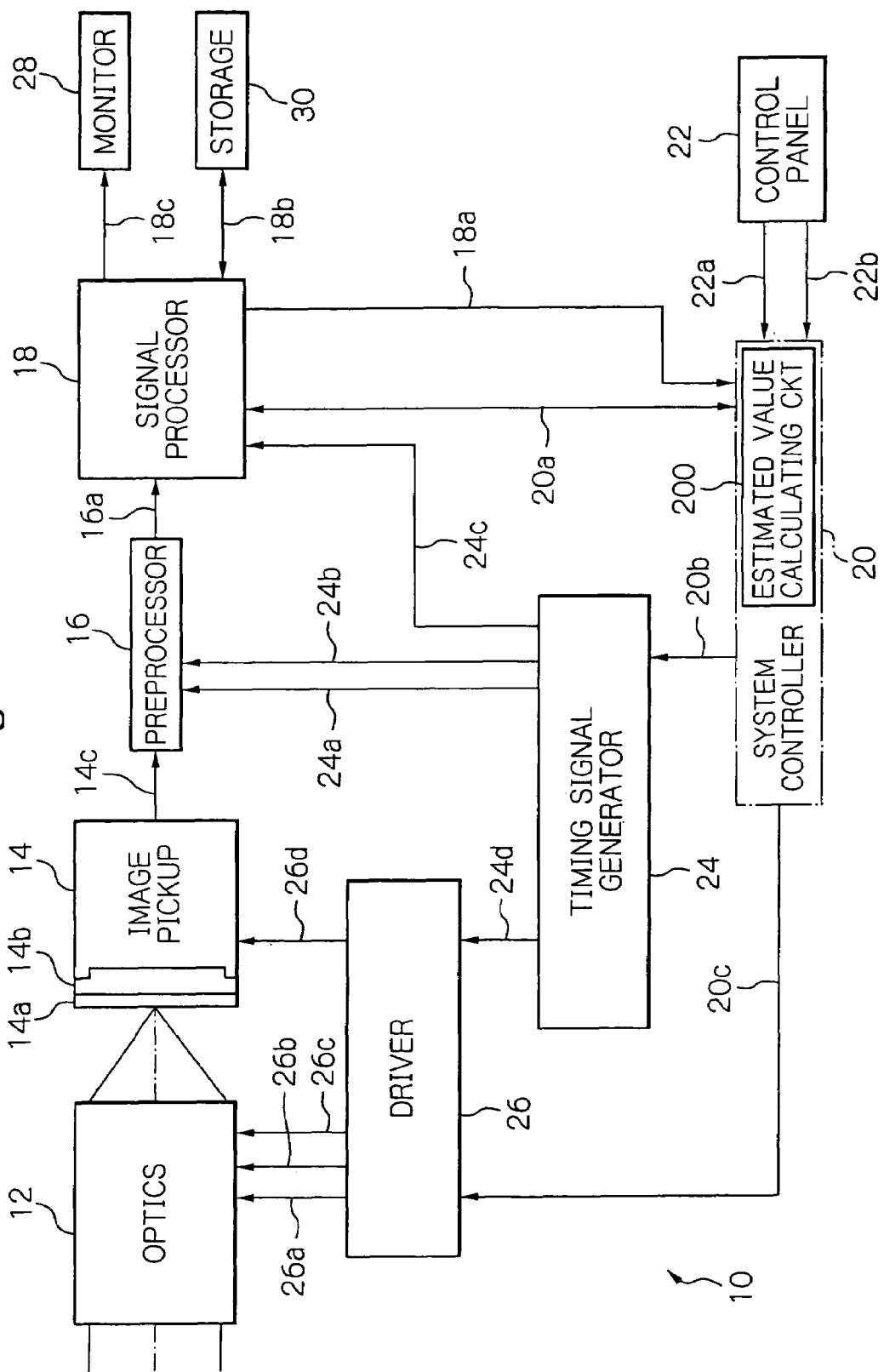
FIG. 1 is a schematic block diagram showing an embodiment of a digital camera implementing a solid-state image pickup apparatus establishing a signal reading method in accordance with the present invention.

Referring to FIG. 1, an image pickup apparatus to which a signal reading method embodying the present invention is applied is implemented as a digital camera by way of example. Part of the illustrative embodiment not relevant to the understanding of the present invention is not shown nor will be described specifically. Signals are designated by reference numerals attached to connections on which they appear.

As shown in FIG. 1, the digital camera, generally 10, includes optics 12, an image pickup section 14, a preprocessor 16, a signal processor 18, a system controller 20, a control panel 22, a timing signal generator 24, a driver 26, a monitor 28, and a storage 30 interconnected as illustrated. The optics 12 includes a lens system, a zoom mechanism, an iris control mechanism, and an AF control mechanism, although not shown specifically.

The zoom mechanism controls the angle of viewing a scene to be picked up while the AF mechanism automatically shifts lenses included in the lens system to focus the camera 10 on a desired subject. A particular motor is assigned to each of the zoom mechanism and AF control mechanism for translating the lenses and is driven by a drive signal 26a fed from the driver 26.

The iris control mechanism constitutes an AE control mechanism for adjusting the quantity of incident light and turns its ring portion in response to a drive signal 26b fed from the drier 26. The ring portion causes blades thereof to overlap each other and form a round iris or lens opening, so that an incident light beam is restricted by the iris. Alternatively, the iris control mechanism may be implemented as a mechanical shutter combined with the lenses as a lens shutter.

The mechanical shutter prevents light from being incident to the image pickup section 14 except for the time of image pickup or shooting and functions to determine an exposure time on the basis of the start and end of exposure. The mechanical shutter may be implemented as a focal plane shutter customary with a single-lens reflex camera and configured to cause a shutter screen to run vertically or horizontally for thereby effecting slit exposure. Alternatively, the mechanical shutter may be implemented as a lens shutter, as mentioned above. In any case, the mechanical shutter selectively opens or closes in response to the drive signal 26c.

The image pickup section 14 includes an optical low-pass filter 14a and a solid-state image sensor 14b on which a color filter, not shown, is positioned. The low-pass filter 14a limits the spatial frequency of incident light to a range below the Nyquist frequency.

Figure 2A:
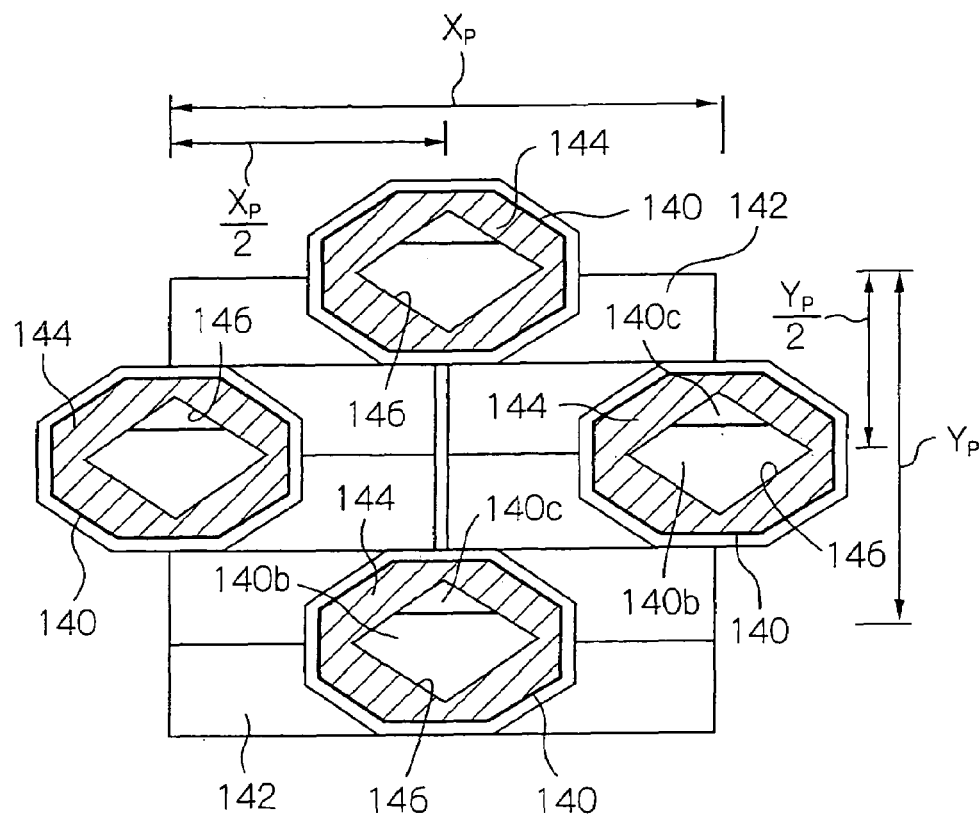
FIG. 2A schematically shows part of a solid-state image sensor included in the digital camera of FIG. 1.

FIG. 2A shows part of the solid-state image sensor 14b in an enlarged scale. As shown, the image sensor 14b includes an array of photosensitive cells 140 implemented by CCDs. The photosensitive cells 140 on the same row are arranged at a pixel pitch of $X_p$ while the photosensitive cells 140 on the same column are arranged at a pixel pitch of $Y_p$. Further, the photosensitive cells 140, adjoining a given photosensitive cells 140, each are spaced from the given cell by pixel pitches of $X_p/2$ and $Y_p/2$ in the direction of row and the direction of column, respectively. In this configuration, the photosensitive cells 140 are densely arranged in the image sensor 14b. Vertical transfer registers 142 are formed between nearby columns of photosensitive cells 140 while extending zigzag in such a manner as to skirt round the cells 140.

Figure 2B:
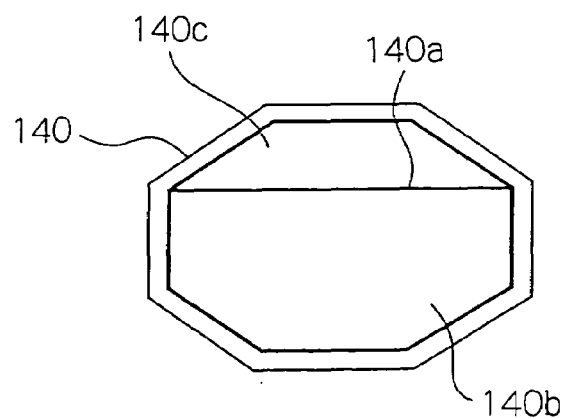
FIG. 2B schematically shows one of photosensitive cells included in the image sensor shown in FIG. 2A.

As shown in FIG. 2B, with the illustrative embodiment, each photosensitive cell 140 has an octagonal shape in a plane perpendicular to the optical axis of the optics 12 and its photosensitive area partitioned into a main region 140b and a subregion 140c by a boundary region 140a. The main and subregions 140b and 140c respectively occupy a relatively larger area and a relatively smaller area of the photosensitive cell 140 and therefore have higher sensitivity and lower sensitivity to incident light, respectively.

Referring again to FIG. 2A, a light-screening layer 144, indicated by hatching, is formed in part of the individual photosensitive cell 140 in such a manner as to cover peripheral part of the photosensitive area of the cell 140 to intercept incident light. Each light-screening layer 144 has an optical opening or aperture 146 cut that permits incident light to pass therethrough. Such light-screening layers 144 are configured to fully cover the vertical transfer registers 142, although not shown specifically.

As shown in FIG. 1, the driver 26 feeds drive signals 26d to the image sensor 14b as well. The dive signals 26d include field shift pulses, a horizontal and a vertical drive signal φH and φV, respectively, and an OFD (Over Flow Drain) signal, which are selectively output in accordance with the operation mode and read-out control.

In the illustrative embodiment, a particular electrode, not shown, is formed in each of the main and subregions 140b and 140c, such as to enable signal charges stored in the main and subregions 140b and 140c to be read out independently of each other. Field shift pulses are selectively fed to the two electrodes at the same timing or at different timings in accordance with read-out control, i.e. in a mixed read-out mode or an independent read-out mode, respectively.

Considering the amount of saturation, the image sensor 14b is configured to sequentially read out signal charges from the main regions 140b and subregions 140c of the photosensitive cells 140 in this order. Stated another way, the signal charges of the main regions 140b and those of the subregions 140c are read out independently of each other in an interlacing fashion. The signal charges thus read out are fed from the image sensor 14b to the preprocessor 16 in the form of analog voltage signals 14c.

The preprocessor 16 includes a CDS (Correlated Double Sampling) circuit for canceling noise, a GCA (Gain-Controlled Amplifier), and an ADC (Analog-to-Digital Converter), although not shown specifically. The CDS circuit and ADC respectively receive CDS pulses 24a and a conversion clock signal 24b from the timing signal generator 24. The preprocessor 16 cancels noise contained in the input analog voltage signals 14c, shapes the wave of the resulting noise-free voltage signals and then digitizes the wave-shaped voltage signals, thereby outputting image data 16a. The image data 16a thus output all are delivered to the signal processor 18.

FIG. 3 shows a specific configuration of the signal processor 18. As shown, the signal processor 18 includes image memories 180a and 180b, WB (White Balance) gain circuits 182a and 182b, gamma correctors 184a and 184b, an image adder 186, a synchronization processor 188, a corrector 190, a compander 192, and an image reducer 194 interconnected as illustrated. The signal processor 18 additionally includes a signal generating circuit although not shown specifically. This signal generating circuit operates in response to a control signal 20a fed from the system controller 20 and includes a PLL (Phase-Locked Loop) circuit capable of generating a plurality of different frequencies. More specifically, the signal generating circuit multiplies the oscillation frequency of an oscillator, or reference clock, to thereby generate a plurality of clock signals each having a particular frequency. The clock signals are selectively fed to the system controller 20 and timing signal generator 24.

The timing signal generator 24 feeds timing signals 24c to the signal processor 18. The timing signals include a horizontal sync signal HD, a vertical sync signal VD and clock signals meant for various sections in the apparatus, which will be described later.

The image memories 180a and 180b, functioning as buffer memories, each temporarily store the image data 16a. When a single frame of picture is picked up, the one image memory 180a is adapted to receive pixel data 16a output from, e.g. the main region 140b of the individual photosensitive cell 140 or mixed pixel data 16a output from the entire photosensitive area of the photosensitive cell 140. The other image memory 180b is adapted to receive pixel data 16a output from the subregion 140c. Those pixel data 16a are written into or read out from the image memories 180a and 180b in response to the control signal 120a fed from the system controller 20. Further, the pixel data 16a are thinned out, or reduced, when read out from the image memories 180a and 180b, by taking account of pixel positions in the photosensitive array. The image memories 180a and 180b should preferably be implemented by nonvolatile memory devices where the same pixel data should be repeatedly read out.

The image memory 180a is connected to the WB gain circuit 182a, gamma corrector 184a, image adder 186, synchronization processor 188, corrector 190, compander 192, and image reducer 194. The image memory 180b is connected to the WB gain circuit 182b, gamma corrector 184b and the image adder 186. The pixel data temporarily stored in the image memories 180a and 180b are respectively fed to the WB gain circuits 182a and 182b in response to the control signal 20a.

The WB gain circuits 182a and 182b execute WB adjustment and gain correction on the pixel data fed from the image memories 180a and 180b, respectively. The WB gain circuits 182a and 182b deliver the pixel data thus adjusted to the gamma correctors 184a and 184b, respectively, under the control of the system controller 20.

The gamma correctors 184a and 184b each may include a lookup table for gamma correction and use the lookup table to execute gamma correction on the input image data. The gamma corrector 184a feeds the image data thus subjected to gamma correction to either one of the image adder 186 and synchronization processor 188 under the control of the system controller 20. The gamma converter 184a delivers the corrected image data to the system controller 20 as pixel data 18a shown in FIG. 1. The other gamma corrector 184b is caused to deliver the corrected pixel data to the image adder 186 or stop operating by the system controller 20, as will be described more specifically later.

The image adder 186 is adapted to add the image data received in connection with the photosensitive regions included in each of the photosensitive cells 140 to each other, thereby broadening the dynamic range of the image signals. The operation of the image adder 186 will be described more specifically later. The result of addition is fed from the image adder 186 to the synchronization processor 188 under the control of the system controller 20.

The synchronization processor 188 uses the result from the image addition or synthesis to execute pixel interpolation and color interpolation. More specifically, the synchronization processor 188 interpolates pixel data in virtual pixels, i.e. vacant positions where the photodiodes are absent due to the pixel shift arrangement of the photodiodes 140. Together with the pixel interpolation, the broadening of the generated pixel data may be performed, if desired. Since the illustrative embodiment, using a single color filter, the pixel data of each pixel are of either one of three primary colors R (red), G (green) and B (blue), the color interpolation is executed so as to generate pixel data corresponding to the other two colors to thereby prepare a full set of R, G and B pixel data. The term "synchronization" in the context is used in this sense. The interpolated or planar R, G and B pixel data are fed from the synchronization processor 188 to the corrector 190 under the control of the system controller 20.

The corrector 190 is adapted to execute various kinds of correction, including color-difference matrix processing, contour enhancement and gain adjustment on the planar R, G and B image data. Color-difference matrix processing uses the pixel data and a preselected coefficient to generate luminance data Y, color data $C_b$ and $C_r$, or color difference data (B−Y) and (R−Y). The corrector 190 then executes tonality correction, contour enhancement and gain adjustment on the image data thus generated and delivers the resulting image data to the compander 190 under the control of the system controller 20.

The compander 190 is adapted to compress the image data, which may be fed thereto in a camera or still picture mode or a movie mode, in accordance with JPEG (Joint Photographic coding Experts Group) standards or MPEG (Moving Picture coding Experts Group) -1 or -2 standards. The resulting compressed image data, labeled 18b, are fed and written into the storage 30 under the control of the system controller 20. Also, the compander 190 is capable of expanding the compressed image data 18b read out from the storage. 30 under the control of the system controller 20. Expansion is inverse in procedure to compression.

The image reducer 192 is adapted for thinning out the input image data in compliance with the size and display format of a monitor 28 shown in FIG. 1 and feeds the image data 18c so thinned out to the monitor 28 under the control of the system controller 20.

Referring again to FIG. 1, the system controller 20 is implemented by a microcomputer or a CPU (Central Processing Unit) for controlling the common sections of the camera 10 and sections assigned to digital processing. More specifically, the system controller 20 establishes either one of the camera mode and movie mode in the camera 10 in response to a mode signal 22a received from the control panel 22. The system controller 20 executes photometry in response to the mode signal 22a and a trigger signal 22b, which is output from a shutter release button, not shown, and indicates an image pickup timing, and receives the pixel data 18a derived by the photometry from the signal processor 18.

The system controller 20 includes an estimated value calculating circuit 200, which, in turn, includes an operating circuit for calculating an F-number and a shutter speed. The estimated value calculating circuit 200 is adapted to determine a luminance distribution on the basis of the input image data 18a to calculate an estimated photometric value. The estimated photometric value may be defined by a simple, integrated value or an estimation function P, which will be described later. In the illustrative embodiment, the estimation function P is used to determine the characteristics of a scene to be picked up. The estimated value calculating circuit 200 compares the estimated photometric value thus calculated with a preselected threshold value to thereby determine whether or not dynamic range broadening processing is necessary with respect to the F-number, shutter speed and scene.

If desired, the estimated value calculating circuit 200 may be included in the signal processor 18, in which case the signal processor 18 will feed the calculated integrated value 18a to the system controller 20 instead of the image data 18a subjected to gamma correction.

Also, the system controller 20 generates control signals 20a, 20b and 20c matching with the F-number, shutter speed and the result of decision made by the estimated value calculating circuit 200. More specifically, the system controller 20 generates the control signals 20a, 20b and 20c in accordance with the read-out mode, i.e. the independent read-out mode or the mixed read-out mode. The control signals 20a, 20b and 20c are fed to the signal processor 18, timing signal generator 24 and driver 26, respectively. Among them, the control signal 20a is generated with consideration given to control over line interpolation and signal generation in the signal processor 18 as well as control necessary for signal processing. Further, the system controller 20 controls the preprocessor 16 and the writing in and reading out of image data to and from the storage 30, although not shown specifically.

The control panel 22 includes a mode selecting section in addition to the shutter release button mentioned earlier. The mode selecting section, although not specifically shown, is operated to select either one of the camera mode and movie mode and delivers the mode signal 22a to the system controller 20. The shutter release button, also not shown, has a first and a second stepwise stroke. More specifically, the shutter release button conditions the camera 10 for preliminary image pickup when depressed in its first stroke S1 to a half-depth position or conditions it for actual image pickup when depressed in its second stroke S2 to a full-depth position. The shutter release button outputs the trigger signal 22b when depressed in its second stroke S2. The control panel 22 may additionally include a zoom select switch and direction keys and may be configured to allow the operator to select conditions appearing on an LCD (Liquid Crystal Display) panel, not shown.

As a reference clock signal, the timing signal generator 24 receives the clock signal, not shown, fed from the signal processor 18. The timing signal generator 24 generates timing signals in response to the reference clock signal and control signal 20b, which is fed from the system controller 20. Those timing signals include a vertical and a horizontal sync signal, field shift pulses, a vertical and a horizontal transfer signal and an electronic shutter pulse as well as CDS pulses 24a and conversion clock signal 24b.

In the illustrative embodiment, the timing signal generator 24 outputs the field shift pulses at timings different from, or identical to, each other in accordance with the read-out control, i.e. independent or mixed read-out control, respectively. The timing signals, collectively labeled 24d and including the vertical and horizontal sync signals, field shift pulses, vertical and horizontal transfer signals and electronic shutter pulse, are selectively delivered to the driver 26 in accordance with the operation. The CDS pulses 24a and conversion clock signal 24b are delivered to the preprocessor 16. The timing signal 24c is fed to the signal processor 18.

The driver 26 includes a drive circuit, not shown, for generating the drive signals 26a through 26d in response to the timing signals 24d and control signal 20c input thereto. More specifically, the driver 26 feeds, in response to the control signal 20c, the drive signals 26a and 26b to the lens system of the optics 12 and iris control mechanism, respectively, for thereby causing them to perform AF and AE control. Also, the driver 26 delivers the drive signal 26c to the mechanical shutter at the pickup timing defined by manipulating the shutter release button, causing the mechanical shutter to open and then close.

Further, the driver 26 feeds the drive signal 26d to the image sensor 14b in response to the timing signals 24d. The drive signal 26d causes the image sensor 14b to store signal charges in the main and subregions 140b and 140c of the individual photosensitive cell 140 over the exposure time. The signal charges are read out from the main and subregions 140b and 140c to the vertical transfer registers 142 either independently or simultaneously in accordance with the conditions stated previously. The signal charges are then transferred to horizontal transfer registers, not shown, and then converted to analog voltage signals 14c via an output amplifier not shown.

The monitor 28, which receives the image data 18c from the signal processor 18, is generally implemented by an LCD monitor. An LCD controller, not shown, applies a voltage in accordance with the image data 18c for thereby switching the orientation of LC molecules to visualize a picture represented by the image data 18c on the monitor 28. The LCD monitor may, of course, be replaced with any other type of miniature, power-saving display unit, which allows the user to view a picture appearing thereon and saves power.

The storage 30 includes a recording medium for storing therein the image data fed from the signal processor 18. The recording medium maybe implemented by any one of a semiconductor memory, an optical disk, a magneto-optical disk and so forth. The storage 30 may be adapted to write or read out data into or from the recording medium by means of a pickup transducer or the combination of a pickup transducer and a magnetic head in compliance with the type of recording medium under the control of the system controller 20.

With the configuration described above, the digital camera 10 uses the pixel data generated in the preliminary pickup mode to read out signal charges from the image sensor 14b in either one of the independent and mixed read-out modes to thereby perform actual image pickup. Subsequently, the camera 10 executes signal processing in compliance with the current read-out mode for thereby producing a picture. This successfully simplifies the operation and signal processing of the camera 10.

A specific operation of the digital camera 10 will be described with reference to FIG. 4. On the power-up of the digital camera 10, the system controller 20 executes initialization not shown. Assume that the camera mode is selected on the control panel 22. While the digital camera 10 generally displays a movie on the monitor 28 after the initialization, this part of the operation will not be described specifically because it is not relevant to the understanding of the illustrative embodiment.

In the above condition, the system controller 20 determines whether or not the operator of the digital camera 10 has pushed the shutter release button in its first stroke (S1) (step S10). If the answer to the step S10 is negative (NO), then the system controller 20 repeats the step S10. If the answer to the step S10 is positive (YES), then the system controller 20 establishes the preliminary pickup mode in response to a trigger signal 22b output from the control panel 22 and representative of the stroke S1 of the shutter release button (step S12).

In the step S12, the system controller 20 outputs control signals 20a, 20b and 20c defined in the preliminary pickup mode for thereby executing photometry. At this instant, signal charges are read out from the image sensor 14b in, e.g. the independent read-out mode. More specifically, the imaging plane of the image photosensitive array of the image sensor 14b, including the bidimensionally arranged photosensitive cells 140, is divided into eight blocks in its horizontal direction and eight blocks in its vertical direction, i.e. sixty-four blocks in total. In the independent read-out mode, signal charges are read out from, e.g. only the main regions 140b of the photosensitive cells 140 belonging to those blocks. Analog voltage signals 14c, corresponding to the signal charges thus read out, are digitized by the preprocessor 16 and then input to the signal processor 18 in the form of digital image data 16a. The signal processor 18 executes WB gain control and gamma correction on the digital image data 16a and delivers the resulting processed image signal 18a to the system controller 20.

In the system controller 20, the estimated value calculating circuit 200 selects, among the pixel data 18a derived from the initial F-number and shutter speed, the pixel data whose estimated photometric values are larger than the threshold value, and then determines an F-number and a shutter speed for use in an actual pickup to follow as adequate exposure (step S14).

Figure 5:
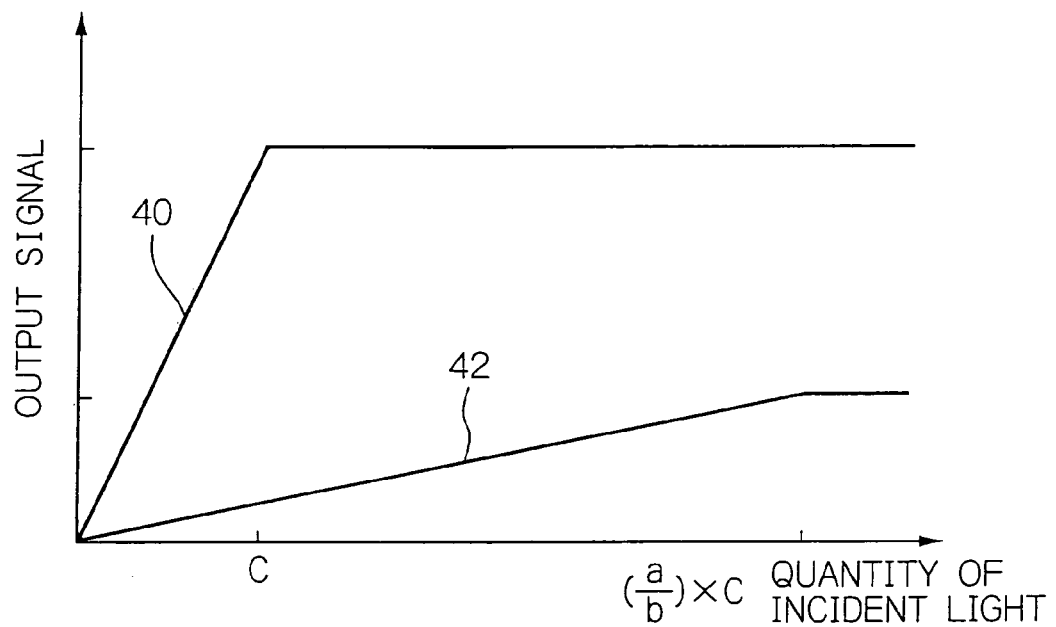
FIG. 5 is a graph useful for understanding how the illustrative embodiment broadens a dynamic range in the digital camera of FIG. 1.

FIG. 5 shows a relation between the quantity of incident light on its abscissa and the photoelectric transduction characteristic, i.e. signals output from the main and subregions 140b and 140c on its ordinate. The output signal level is quantized after analog-to-digital conversion. Assume that the main region 140b has photoelectric characteristics represented by a curve 40 in which sensitivity and saturation output both are normalized to "1". Then, the subregion 140c has photoelectric characteristics represented by another curve 42 in which sensitivity and saturation output are, e.g. 1/a and 1/b, respectively. As shown in FIG. 5, the maximum quantity of incident light c that allows pixel data output from the main regions 140b to be reproduced is determined in accordance with the adequate exposure obtained previously. It will be seen that pixel data output from the subregions 140c have a dynamic range, which is represented by a saturated output for given sensitivity, broadened by a/b times.

The effect of the processing for thus broadening the dynamic range will be described hereinafter. This processing is effective when the sixty-four blocks of pixel data generated in response to the maximum quantity of incident light c on photometry include saturated blocks which are equal to in number or more than a predetermined number or threshold. If the number of such particular pixels is smaller than the predetermined threshold, then the processing is effective, but merely renders the tone of the resulting image softer.

As shown in FIG. 4, the system controller 20 determines in a step S16 whether or not the dynamic range broadening processing is effective from the above-stated standpoint. If the answer of the step S16 is YES, then the system controller 20 advances to a step S18 for selecting the independent read-out mode for actual pickup to follow and then generating the appropriate control signals 20a, 20b and 20c. If the answer of the step S16 is NO, then the system controller 20 advances to a different step S20 for selecting the mixed read-out mode for actual pickup and then generating the control signals 20a, 20b and 20c.

More specifically, the system controller 20 executes the following procedure for determining whether or not the dynamic range broadening processing should be executed. First, the system controller 20 selects the maximum value included in the sixty-four blocks of pixel data as a maximum estimated value. The system controller 20 then compares the maximum estimated value with the maximum quantity of incident light c in order to accurately grasp the maximum estimated value as a peak quantity and reflect it on an estimation function. The system controller 20 then performs an operation, (maximum estimated value)/$\log_2 c$.

On the other hand, the system controller 20 selects a set value B, which is, e.g. three-fourths of the maximum estimated value, beforehand. The system controller 20 then produces an estimation function P:

$$P = (\text{maximum estimated value}/\log_2 c) \times (\text{number of estimated values above } B)/(\text{number of effects}). \quad (1)$$

In the Expression (1), the "number of estimated values above B" is the number of blocks whose estimated value, detected on the photometry, is grater than the set value B, and the "number of effect" is a threshold equal to a preselected number of blocks which is designed from the standpoint of the effective dynamic range broadening processing as described above.

Because the dynamic range broadening processing is applied to the entire area of an image, the number of blocks with which the above processing is effective is another important factor for determining whether or not to execute the processing. As the Expression (1) indicates, the estimation function P is represented by the product of the two factors stated above. In the illustrative embodiment, eight of the sixty-four blocks of pixel data is selected to be the number that makes the processing effective. Stated another way, when one-eighth of the sixty four blocks of pixel data has an estimated value above the set value B, the processing is effective.

It should be noted that the estimation function P represented by the Expression (1) and the specific values stated above are only illustrative.

If the estimation function P thus calculated is larger than a preselected threshold value L, then the system controller 20 executes the dynamic range broadening processing. However, if the estimation function P is smaller than the threshold value L, then the system controller 20 does not execute the processing, but performs control for effecting usual signal processing.

The system controller 20, having selected the independent read-out mode and output the control signals 20a, 20b and 20c, determines whether or not the operator has pushed the shutter release button in the second stroke S2 for actual pickup (step S18). If the answer of the step S18 is NO, then the system controller 20 waits until the shutter release button has been pushed in the further stroke S2. If the answer of the step S18 is YES, then the system controller 20 executes exposure and then causes signal charges to be read out (step S22). In the step S22, signals charges stored in the main regions 140b and those stored in the subregions 140c are sequentially read out in this order. The independent read-out mode therefore needs a period of time corresponding to two frames to complete.

After the step S22, the system controller 22 executes the dynamic range (DR) broadening processing on pixel data derived from the signal charges (step S24). More specifically, as shown in FIG. 3, the pixel data derived from the main regions 140b and the image data derived from the subregions 140c are written into the image memories 180a and 180b, respectively. Subsequently, the WB gain circuits 182a and 182b respectively execute white balance adjustment and gain adjustment on the pixel data stored in the image memories 180a and 180b and deliver the pixel data thus adjusted to the gamma correctors 184a and 184b. The gamma correctors 184a and 184b, while enabled with the system controller 20, receive the adjusted pixel data and subject them to gamma correction. The resulting corrected pixel data are fed from the gamma correctors 184a and 184b to the image adder 186.

The image adder 186 adds the pixel data derived from the main and subregions 140b and 140c to each other, implementing a reproducible light quantity range of $\log_2 c + \log_2 (a/b) = \log_2(a/b)c$. Antilogarithm satisfies the range represented by the curve 42 plotted in FIG. 5. By the steps described so far, the dynamic range of the pixel data is broadened.

If desired, the image adder 186 may be configured to vary an addition ratio or a standardizing coefficient, which is used for addition, in accordance with the scene captured.

The pixel data broadened in dynamic range are in turn fed to the synchronization processor 188 of the signal processor 18 in response to the control signal 20a output from the system controller 20. After the synchronization, the pixel data are fed to the corrector 190. The corrector 190 operates the pixel data to output the corrected image data.

On the other hand, if the answer of the step S16 is NO, meaning that the dynamic range broadening processing is not effective, then the system controller 20 selects the mixed read-out mode for actual pickup and then generates the control signals 20a, 20b and 20c appropriate for the read-out mode. The system controller 20 then determines whether or not the operator has pushed the shutter release button in its second stroke S2 (step S20). If the answer of the step S20, then the system controller 20 waits until the shutter release has been depressed in its second stroke S2. If the answer of the step S20 is YES, then the system controller 20 executes exposure and then causes signal charges to be read out (step S26). In the mixed read out mode, signal charges stored in the main and subregions 140b and 140c are read out to the vertical transfer registers 142 at the same time. Because a single packet or potential well is formed for each photosensitive cell 140 in each of the vertical transfer registers 142, the signal charges read out from the cell 140 are mixed together.

After the step S26, the system controller 20 executes usual signal processing with pixel data 16a derived from the signals 14c read out from the image sensor 14b (step S28). In this case, the image memory 180b, WB gain circuit 182b, gamma corrector 184b and image adder 186 are not necessary and therefore caused to stop operating. By selecting the mixed read-out mode and making the above circuits 180b, 182b, 184b and 186 inoperative, it is possible not only to obviate wasteful dynamic range broadening, which would aggravate power consumption, but also to obviate a picture with soft tone. The above pixel data are then processed by the synchronization processor 188 and corrector 190 in response to the control signal 20a output from the system controller 20. The mixed read-out mode enhances the sensitivity of the individual photosensitive cell as well as the S/N (signal-to-noise) ratio of the resulting signals.

In both of the dynamic range broadening processing and usual processing, the compander 192 compresses the image data and stores the compressed image data in the storage 30 (step S30). In the signal processor 18, the image reducer 194 thins out the image data to thereby cause the monitor 28 to display a picture in a reduced scale. After the compressed image data have been written into the storage 30, the pickup of a single still picture ends.

In a continuous image pickup mode not shown or described specifically, the dynamic range broadening processing is not performed with the illustrative embodiment. The usual processing excludes the dynamic range broadening processing to include a minimum of operation. The continuous image pickup operation can therefore complete the signal reading in one-half of a period of time required in an application in which the dynamic range broadening processing is always performed. This allows consecutive shots to be effected at shorter time intervals.

As stated above, the illustrative embodiment is adapted to determine whether or not the dynamic range broadening processing is effective, and select the independent read-out mode if the dynamic range broadening processing is determined effective or otherwise select the mixed read-out mode. In the independent read-out mode, the dynamic range broadening processing is applied to image data while, in the mixed read-out mode, not only the reading time is reduced, but also wasteful processing is excluded.

Further, in the mixed read-out mode, usual signal processing is executed with circuits unnecessary for the usual signal processing being rendered inoperative, thereby saving power. In addition, by reading pixels while mixing them together, it is possible to enhance the sensitivity of the individual photosensitive cell and to improve the S/N ratio of signals. A decrease in reading time achievable with the mixed read-out mode contributes a great deal to rapid continuous shots as well.

In summary, in accordance with the signal reading method for a solid-state image sensor, a particular read-out mode is selected in accordance with the luminance distribution of a scene captured. In a mixed read-out mode, the number of times of read-out is reduced, compared to an independent read-out mode. This means a decrease in a period of time necessary for reading out signals, and therefore saves power and promotes rapid continuous image pickup. Further, the mixed read-out mode allows converted signal charges to be effectively used for thereby enhancing the sensitivity and S/N ratio of the image pickup apparatus.

The entire disclosure of Japanese patent application No. 2002-285495 filed on Sep. 30, 2002, including the specification, claims, accompanying drawings and abstract of the disclosure is incorporated herein by reference in its entirety.

While the present invention has been described with reference to the particular illustrative embodiment, it is not to be restricted by the embodiment. It is to be appreciated that those skilled in the art can change or modify the embodiment without departing from the scope and spirit of the present invention.

What is claimed is:

1. A method of reading out signal charges from a solid-state image sensor, comprising:
   a first step of preparing a solid-state image pickup apparatus comprising a solid-state image sensor having a plurality of photosensitive cells arranged in a bidimensional array for converting incident light to electric signal charges, each of the plurality of photosensitive cells including a main region and a subregion smaller in area than the main region, the apparatus executing signal processing on pixel data produced from the signal charges;
   a second step of causing the solid-state image pickup apparatus to perform preliminary image pickup of a scene;
   a third step of determining a luminance distribution representative of the scene subject to the preliminary image pickup on a basis of pixel data obtained from a plurality of blocks formed in the bidimensional array to calculate an estimated photometric value that estimates the scene;
   a fourth step of comparing the estimated photometric value with a predetermined threshold value, above which a dynamic range is effective which defines a reproducible range of the incident light;
   a fifth step of controlling the image sensor, if the estimated photometric value is smaller than the threshold value, to read out the signal charges generated in the main region and the subregion of each of the photosensitive cells while mixing the signal charges with each other for the photosensitive cell; and
   a sixth step of controlling the image sensor, if the estimated photometric value is not smaller than the threshold value, to read out the signal charges generated in the main region and the subregion of each of the photosensitive cells individually from each other.

2. The method in accordance with claim 1, wherein said fourth step further comprises a substep of selecting either one of said sixth step and said fifth step in dependence upon whether or not the plurality of blocks contain blocks which have the estimated photometric value not smaller than the threshold value and exceed in number a predetermined threshold number.

3. The method in accordance with claim 1, wherein said fifth step further comprises a substep of causing one of two signal processing lines, which respectively process the pixel data derived from the main region and the subregion, to operate while interrupting an operation of another of the signal processing lines and an operation of mixing pixel data processed by the two signal processing lines to broaden the dynamic range.

4. The method in accordance with claim 2, wherein said fifth step further comprises a substep of causing one of two signal processing lines, which respectively process the pixel data derived from the main region and the subregion, to operate while interrupting an operation of another of the signal processing lines and an operation of mixing pixel data processed by the two signal processing lines to broaden the dynamic range.

* * * * *